United States Patent
Gandhi et al.

(10) Patent No.: US 9,445,617 B2
(45) Date of Patent: Sep. 20, 2016

(54) PROCESS FOR EXTRACTION AND DEBITTERIZING SWEET COMPOUNDS FROM STEVIA PLANTS

(71) Applicant: Juvenex, Inc., Southfield, MI (US)

(72) Inventors: Prakash Gandhi, West Bloomfield, MI (US); Indra Baxi, Troy, MI (US); Parag Deval, Pune, IN (US)

(73) Assignee: JUVENEX, INC., Southfield, MI (US)

(*) Notice: Subject to any disclaimer, the term of this patent is extended or adjusted under 35 U.S.C. 154(b) by 0 days.

(21) Appl. No.: 14/678,583

(22) Filed: Apr. 3, 2015

(65) Prior Publication Data

US 2016/0015066 A1    Jan. 21, 2016

Related U.S. Application Data

(60) Provisional application No. 62/026,952, filed on Jul. 21, 2014.

(51) Int. Cl.
| | |
|---|---|
| *A23L 1/236* | (2006.01) |
| *B01D 15/12* | (2006.01) |
| *B01D 15/16* | (2006.01) |
| *B01D 15/42* | (2006.01) |

(52) U.S. Cl.
CPC .......... *A23L 1/2366* (2013.01); *B01D 15/125* (2013.01); *B01D 15/161* (2013.01); *B01D 15/426* (2013.01)

(58) Field of Classification Search
CPC . A23L 1/2366; B01D 15/426; B01D 15/161; B01D 15/125
USPC ......................................... 426/271, 495, 548
See application file for complete search history.

(56) References Cited

U.S. PATENT DOCUMENTS

2011/0091637 A1*  4/2011  Abelyan .................. A23G 1/40
                                                                     426/631
2016/0015066 A1*  1/2016  Gandhi ................. A23L 1/2366
                                                                     426/271

\* cited by examiner

*Primary Examiner* — Helen F Heggestad
(74) *Attorney, Agent, or Firm* — Foley & Lardner LLP (57) ABSTRACT

A method of extracting sweet compounds from *stevia* plant powder includes mixing *stevia* powder and deionized water to create a *stevia* powder slurry, filtering the slurry and adding it to an extraction column, adding an ethanol solution to create an elute, mixing the elute with activated charcoal and filtering the elute, removing the ethanol and water from the elute, and spraying the elute to produce the sweet compounds.

33 Claims, 7 Drawing Sheets

PROCESS FOR EXTRACTION AND DEBITTERIZING SWEET COMPOUNDS FROM STEVIA PLANTS

CROSS-REFERENCE TO RELATED APPLICATIONS

This application claims priority from U.S. Provisional Application No. 62/026,952, filed Jul. 21, 2014, the entire contents of which are incorporated herein by reference.

BACKGROUND

The present application relates generally to the extraction of sweet compounds from *Stevia* leaves and debitterizing the same.

Extraction of components of value from plant material, e.g., plant leaves for food and pharmaceuticals, is widely practiced. Most of these processes use extraction by hot water and/or organic solvents for isolation of a particular compound or refining a class of compounds from the complex mixture. The *stevia* plant, *stevia rebaudiana*, contains sweetening compounds, such as glycosides, which are explained by Kinghom and Soejarto, 1985, as including Stevioside, rebaudioside A(RA), rebaudioside B(RB), rebaudioside C(RC), dulcosides A and dulcosides B.

The *stevia* plant also contains non-sweetening constituents, and selectively extracting the sweetening compounds from the non-sweetening constituents has been the subject of numerous studies over the past several decades. There have been several studies describing the extraction and purification of sweeteners from the dried leaves of the *stevia* plant (Adduci et al., 1987; Yokohama and Sugiyama, 1990; Liu et al., 1991). These conventional methods use large amounts of organic solvents and chemicals for refining natural source sweeteners. Also, U.S. Pat. No. 4,892,938 to Giovanetto discloses a rather complicated process that utilizes several unit operations, including water extraction at room temperature to 65° C., a first strongly acidic ion exchange, followed by a second weakly basic ion exchange for refining Stevioside.

Chinese Patent No. 1132840C discloses a method for purifying *stevia* glycosides through solid-liquid separation. In this process, *stevia* glycosides and ethanol are mixed at a ratio of 1:1.4-1.7 and dissolved with stirring. The resulting solution is subjected to solid-liquid separation, the solids and liquid obtained from which are decolorized and then dried to obtain purified *stevia* glycosides. The content of rebaudioside in the *stevia* product obtained from this process is 88%, and the product still contains undesirable aftertaste and high levels of impurities.

Chinese Patent No. 1098860C discloses a process for separating enriched *stevia* glycosides through vacuum filtration and ion exchange resin. The process uses a crude *stevia* glycosides source material with a ratio of Rebaudioside A to Stevioside ranging from 0.5 to 1.1. The crude *stevia* glycoside is dissolved by stirring the crude with an ethanol-water solvent. The mixture is then filtered to obtain a filtrate, after which the filtrate is desalinated with ion exchange resin and decolorized.

A useful discussion of related technology is found in A. I Bakal & L. O'Brien Nabors, "Stevioside" in Alternative Sweeteners, Marcel Decker Inc., N.Y. 1986 pp-295-307.

U.S. Pat. No. 5,112,610 discloses a method of making a natural sweetener based on *Stevia rebaudiana* that includes the extraction of plant parts of *Stevia rebaudiana* with a solvent to provide an extract, and subjecting the extract to an extraction with a supercritical gas to obtain an extraction residue which is freed from undesired and taste-impairing constituents. However, extraction with only a solvent is an expensive method, and the large amount of solvent has to be removed and disposed of may leave some residue. Moreover, extraction with supercritical gas may induce mixed test in the final product.

At present, there are five major methods being used in attempts to improve the taste of stevioside, which in its unmodified state leaves a bitter and unpleasant aftertaste. The first method is organic solvent distillation such as with the use of a medical alcohol as a solvent to increase the quality of the taste. However, since alcohol is used in the process, any residual alcohol may pose issues for the human body. Moreover, the production yield is low, which highly increases the production cost even though the unpleasant aftertaste persists.

The second method involves using resin to improve the quality of the taste of Stevioside, and involves washing the resin with acid and alkaline solution. The resin will attach to the stevioside in the production process, which leads to relative low yield. Again, the unpleasant aftertaste problem remains unsolved.

The third method involves adding an amino acid group to the stevioside to improve the taste. However, since a large quantity of amino acid is required in the production process, the end product has a relatively high caloric value, thus destroying one of the key benefits of using stevioside (i.e., as a low calorie sweetening agent). One additional issue of this method is that the cost of the added amino acids is relatively high, which in turn increases the production cost.

The forth method involves combining stevioside with glucose, sucrose, and/or lactose to create a stevioside/sugar mixture in an attempt to "mask" or "cover" the taste of the end product. One obvious disadvantage of such a method is that the addition of sugars to the mixture eliminates some of the benefits of using stevioside (e.g., as a low-calorie sweetener). Even with this mixture, however, the bitter taste of the stevioside compounds persists even though it may be partially masked by the presence of the sugars.

The fifth method is described, for example, in U.S. Pat. No. 4,219,571, which discloses a process for producing a sweetener that involves allowing glucosyl transferase to react with stevioside in an aqueous solution to transform the stevioside into an alpha-glycosyl stevioside and hence improve the quality of taste of stevioside by altering the structure of stevioside. It is unclear as to whether such a process actually results in a definitive improvement in the taste of the end product.

Thus, there remains a need for new processes of extracting and debitterizing *stevia* in a simplified and enhanced manner. Furthermore, there remains a need for a *stevia* extract that has no or low aftertaste, and a *stevia* extract that has less non-sweetening constituents.

SUMMARY

Embodiments described herein include, for example, an optimized process for the production of glycosides from *Stevia rebaudiana* Bertoni. In one embodiment, the ground powder of *stevia* is extracted in an aqueous environment by mixing a powder of *stevia* with de-ionized water in a tank or vessel, soaking the mixture in the tank or vessel, passing the aqueous mixture through an adsorbent resin, followed by the desorption of sweet extract. The extraction may be subject to additional steps, including a vacuum filtration treatment.

One aspect of the disclosure provides for a method for extracting sweet compounds from *stevia* plant powder, the method comprising: i) mixing *stevia* powder and deionized water at a temperature of between about 45° C. and about 75° C. to create a *stevia* powder slurry; ii) optionally filtering the *stevia* powder slurry; iii) adding the filtered *Stevia* powder slurry to an extraction column charged with adsorbent polymer resins to provide a *stevia* powder material:water ratio in the range of between about 1:10 to and about 1:16 v/v; iv) adding an ethanol solution having between about 70% and about 100% ethanol concentration to the extraction column, forming the mixture ratio of liquid slurry:ethanol in the range of between about 1:2.3 and about 1:3.75 v/v to discharge an elute; v) mixing the elute with activated charcoal; vi) filtering the elute; vii) optionally removing the ethanol from the elute; viii) optionally passing the alcohol free elute through a water extraction device; and ix) optionally spraying the elute using a spray drying unit to produce a composition comprising the extracted sweet compounds. In one embodiment, the *stevia* powder slurry is mixed to obtain a *stevia*/water homogenized mixture. In some embodiments, the method further comprises holding the *stevia* powder slurry for between about 8 and about 12 hours prior to step (ii). In another embodiment, step (ii) is performed using vacuum filtration, optionally using filter no. 40-45 of Whitman porosity of between about 0.5 and about 20 microns at a pressure of between about 9 and about 12 psi. In yet another embodiment, a collected volume of the elute is not greater than a feed volume of the *stevia* powder slurry. In another embodiment, the elute comprising the sweet compounds is passed through the step (iii-iv), In another embodiment, in step (iii), the *stevia* powder slurry is provided at a temperature of between about 20° C. and about 35° C., preferably 25° C. In another embodiment, a residence time in the extraction column is between about 10 and about 40 minutes. In another embodiment, the *stevia* powder comprises particles having an average particle diameter of between about 70 and about 177 microns. In another embodiment, step (i) is performed in a mixing chamber, the chamber being vertically disposed and having a top opening for receiving the *stevia* powder and for deionized water at a temperature between about 45° C. to about 75° C., and opening at the bottom directly opposite to the top opening for discharging the *stevia* slurry. In another embodiment, step (ii) is performed at room temperature. In another embodiment, the extraction column is vertically disposed and comprises a top opening for receiving *stevia* slurry and a bottom opening for the elute. In another embodiment, step (ii) is performed at room temperature. In another embodiment, the extraction column is vertically disposed and having a top opening for receiving *stevia* slurry liquid and a bottom opening for the elute. In another embodiment in step (v), the activated charcoal is present in an amount between about 2% and about 4% by weight. In another embodiment, the filtering step (vi) utilizes a filtration unit having a vacuum in the range of between about 9 psi and about 12 psi and filter having openings of between about 5 and about 20 microns. In another embodiment, after the filtering step (vi), between about 85% and about 89.5% of the total sweet compounds in the initial *stevia* plant powder are recovered. In another embodiment, the *stevia* plant powder is powdered leaves or powdered plant extract Another aspect of the disclosure provides for a method of extracting sweet compounds from *stevia* plant powder, in a production-scale environment, the method comprising i) mixing *stevia* powder and deionized water at a temperature between about 45° C. and about 75° C. to create a *stevia* powder slurry; ii) optionally filtering the *stevia* powder slurry; iii) adding the filtered *stevia* powder slurry to an extraction column charged with adsorbent polymer resins to provide a *stevia* powder material:water ratio in the range of between about 1:7.8 and about 1:20 v/v; iv) adding an ethanol solution having between about 70% and about 100% ethanol concentration to the extraction column, thereby forming a mixture ratio of liquid slurry:ethanol in the range of between about 0.010:0:12 v/v and about 0.10:0.15 v/v to discharge an elute; v) mixing the elute with activated charcoal; vi) filtering the elute; vii) optionally removing the ethanol from the elute; viii) optionally passing the alcohol free elute through a water extraction device; and ix) optionally spraying the elute using a spray drying unit to produce a composition comprising the extracted sweet compounds. In one embodiment the *stevia* powder slurry is mixed to obtain *stevia*/water homogenized mixture. In some embodiments, the method further comprises mixing the *stevia* powder slurry for between about 8 and about 14 hours prior to step (ii). In another embodiment step (ii) is performed using vacuum filtration at a temperature between about 15° C. and about 35° C., using a high volume continuous filtration device having a porosity diameter less than the an average particle diameter of the *stevia* powder. In another embodiment a collected volume of the elute is not greater than a feed volume of the *stevia* powder slurry in continuous manner to maintain a ratio equal to about 90% of liquid feed. In another embodiment the elute comprising the sweet compounds is passed through the step (iii-iv). In another embodiment in step (iii), *stevia* powder slurry liquid is provided at a temperature of between about 15° C. and about 35° C., preferably 30° C. In another embodiment a residence time in the extraction column is equal to the output rate from the step (i) to step (ii) or (iii), in another embodiment the *stevia* powder has an average particle diameter of about 60 microns. In another embodiment step (i) is performed in a receiving chamber, the receiving chamber being vertically disposed and having a first top opening for receiving *stevia* powder and second top opening for water, and a third opening for a mixing unit, and a fourth opening optionally directly opposite to the top opening for discharging the *stevia* powder slurry. In another embodiment the step (ii) is performed at room temperature. In another embodiment, the step (ii) is performed at room temperature. In another embodiment the extraction column is vertically disposed and comprises a top opening for receiving *stevia* powder slurry and a bottom opening 90° from the top opening for discharging of the elute. In another embodiment in step (v), the activated charcoal is present in an amount between about 0.2% and about 3.0%. In another embodiment the filtering step (vi) utilizes a filtration unit having vacuum in the range of between about 9 psi and about 12 psi and filter having openings of between about 0.25 and about 15 microns. In another embodiment after the filtering step (vi), between about 89% and about 99.1% of the total sweet compounds in the initial *stevia* plant powder are recovered. In another embodiment, the *stevia* plant powder is powdered leaves or powdered plant extract Yet another aspect of the disclosure provides for an extraction of sweet compounds from *Stevia* plant powder, the method comprising: i) mixing *stevia* powder and deionized water at a temperature between about 45° C. and about 75° C. to create a *stevia* powder slurry; ii) filtering the *stevia* powder slurry; iii) adding the filtered *stevia* powder slurry at a temperature between about 14° C. and about 35° C. to an extraction chamber being vertically disposed and having a top opening for receiving filtered *stevia* powder slurry liquid and a bottom opening opposite from the top opening for discharging the sweet compounds, the chamber configured to provide a *stevia* powder material:water ratio in the range of between about 0.070:0.7 v/v and about 0.07:0.95 v/v; iv) holding the *stevia* powder slurry at a room temperature for a period of between about 1 and about 4 hours; v) mixing the *stevia* powder slurry with ethanol having concentration between about 70% and about 100% to form a homogeneous elute; vi) passing the elute through a filtration pump; vii) mixing the elute with activated charcoal; and viii) filtering the elute; ix) optionally removing the ethanol and water from the elute; x) optionally spraying the elute using a spray drying unit to produce a composition comprising the extracted sweet compounds. In another embodiment step (i) is performed for a period of between about 4 and about 24 hours, using a continuous homogenizer unit. In another embodiment the *stevia* powder slurry is passed through a high volume continuous filtration unit having which is smaller than the powder particulate, preferably at a pressure of 12 psi. In another embodiment the *stevia* powder slurry volume after step (ii) is less than the homogenized mixture volume, and equal to about 94% of liquid feed into step (i). In another embodiment the elute in step (v) is provided at a temperature of between about 20° C. and about 40° C. In another embodiment the residence time in step (v) is between about 4 and about 24 hours. In another embodiment the *stevia* plant powder mixture has an average particle diameter of between about 20 and about 60 microns. In one embodiment, the column or vessel does not have adsorbent resins. In another embodiment, steps (ix) and (x) are performed. In another embodiment, the method is performed on a production-scale environment. In another embodiment, the *stevia* plant powder is powdered leaves or powdered plant extract

BRIEF DESCRIPTION OF THE DRAWINGS

FIG. 5(*a*) to FIG. 5(*e*) contain chromatograms from four samples described in the working examples and from raw *stevia* powder. 5(*a*) discloses a Standard; FIG. 5(*b*) discloses a chromatogram of the Sample-1 made by using 1-2% activated charcoal during mixing; FIG. 5(*c*) discloses a chromatogram of the Sample-2 made by using 3% activated charcoal during mixing; FIG. 5(*d*) discloses a chromatogram of the Sample-3 made by using 20% activated charcoal during mixing. FIG. 5(*e*) discloses raw *stevia* powder. The numbered peaks represent: (1) dulcoside A; (2) stevioside; (3) rebaudioside C; (4) rebaudioside A; (5) steviolbioside; (6) rebaudioside B.

DETAILED DESCRIPTION

According to an exemplary embodiment, an improved process for debitterizing *stevia* products for use in conjunction with *stevia* powder is disclosed. This process provides a significant increase in the sweetener output, as compared to conventional methods that are available. The process is relatively simple, yet provides a higher yield of sweet compounds while dramatically reducing or eliminating any unpleasant or bitter aftertaste typically associated with *stevia* products. The product quality and output is cost competitive with other methods. However, the major extraction and debitterizing advantages lie in mixing, filtration and chemical utilized during process operation. The output may be in the range of between about 85% and 99.1%, as compared to between 78% and 84% in conventional processes.

Before the present process is described in greater detail, it is to be understood that the concepts disclosed herein are not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "approximately". The term "approximately" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Aqueous *Stevia* Slurry

*Stevia* powder may be obtained from commercial sources, or by methods known in the art, and generally comprises dried, ground *stevia* leaves or powdered plant extract. The *stevia* leaves can be dried via any conventional manner known in the art or that may be developed in the future, e.g., under the sun or via application of heat. The dried *stevia* leaves are crushed or ground (e.g., manually or with the aid of a machine) into a powder. In one embodiment, the *stevia* powder has has an average particle diameter of between about 70 and about 177 microns, or about 60 microns, or between about 20 and about 60 microns.

The *stevia* powder is introduced to an aqueous environment that includes a solvent to create an aqueous *stevia* slurry. In one embodiment, the solvent is water. According to one particular embodiment, the water is deionized water.

Figure 1:
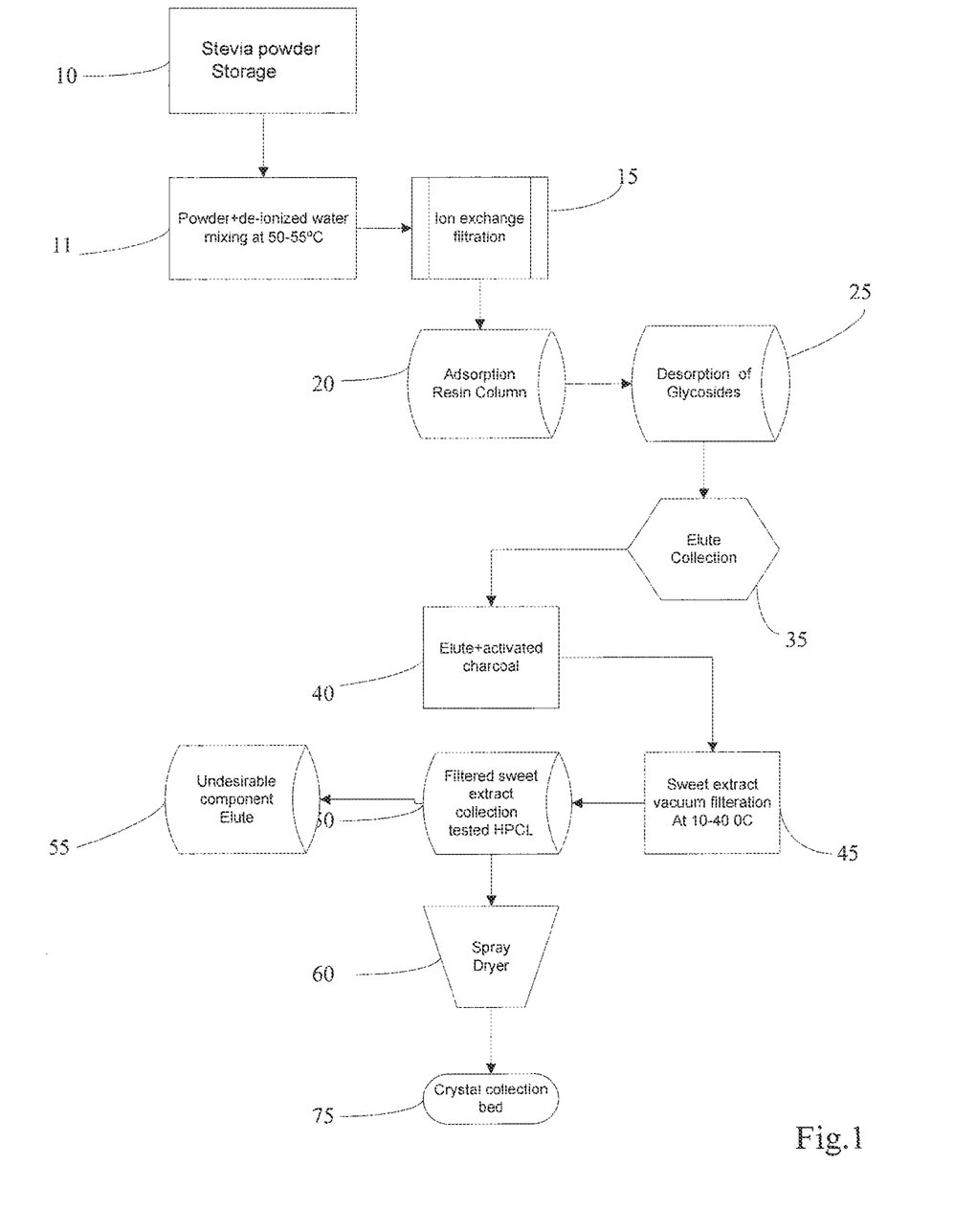
FIG. 1 is a flow diagram of a process for debitterizing *stevia* according to an exemplary embodiment.
Figure 4:
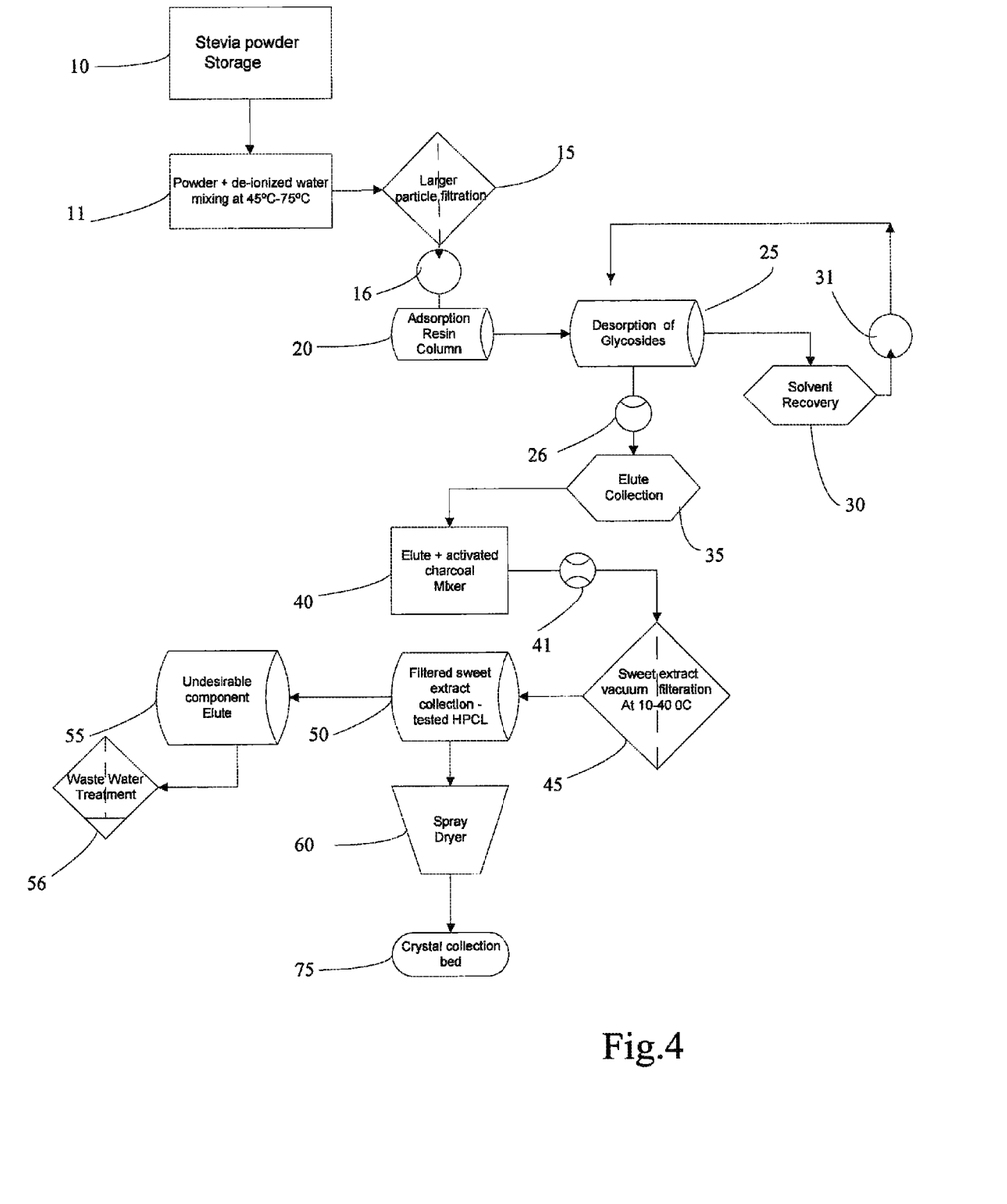
FIG. 4 is a flow diagram of a process for debitterizing *stevia* according to an exemplary embodiment.
Figure 5A:
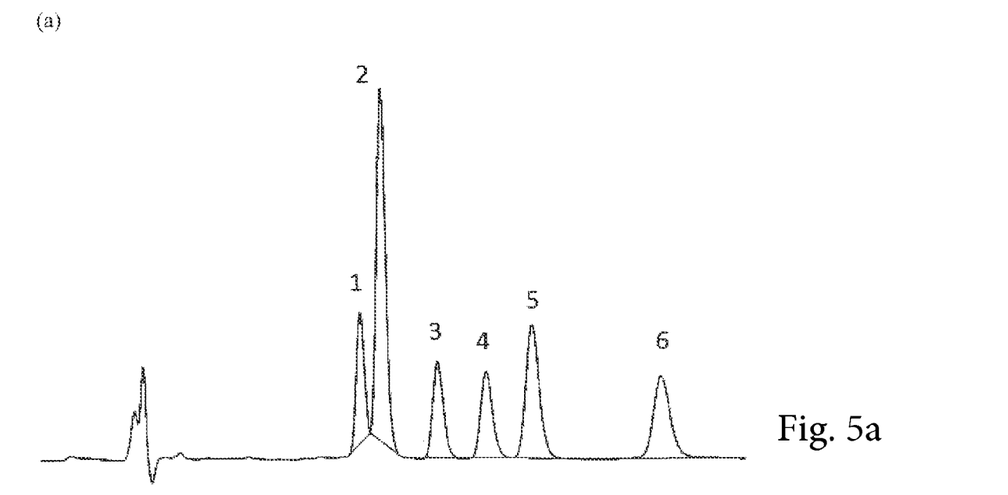
Figure 5B:
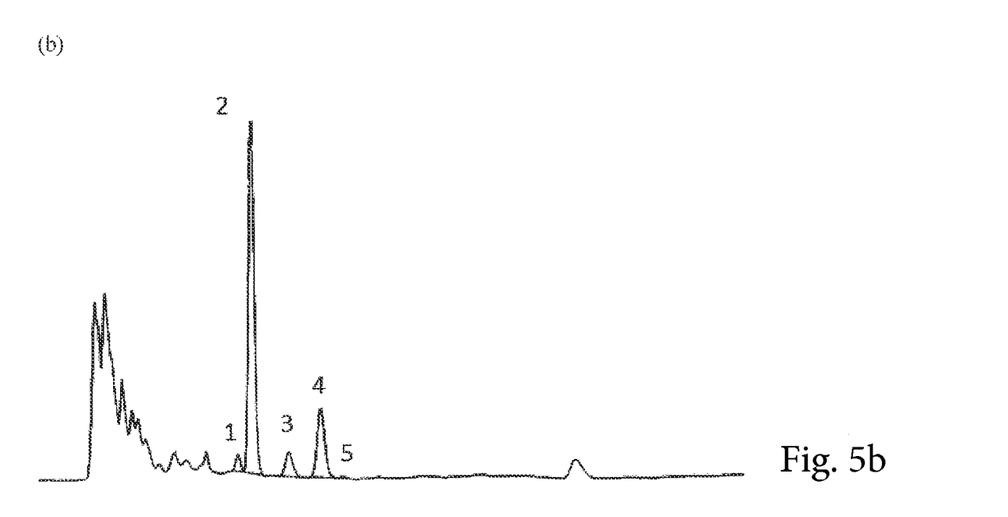
Figure 5C:
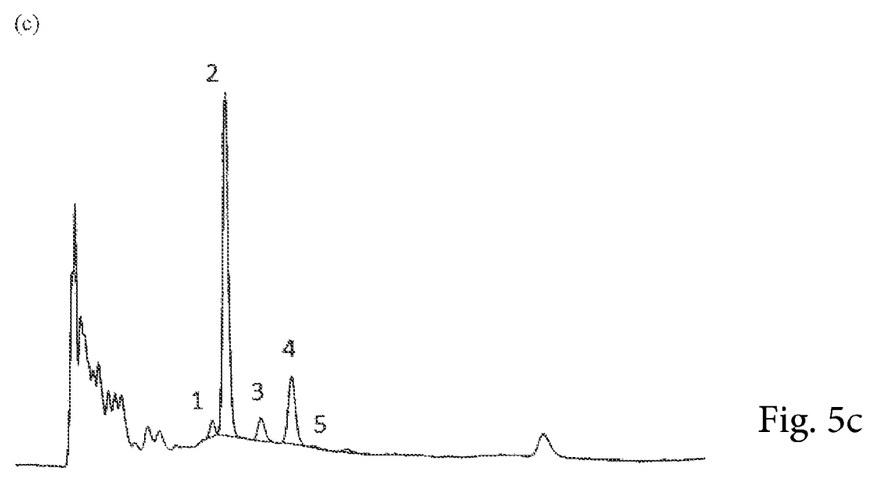
Figure 5D:
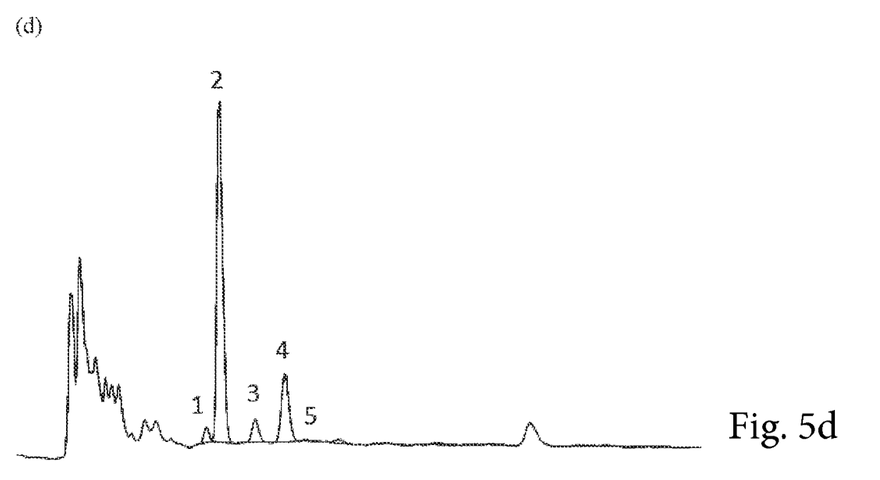
Figure 5E:
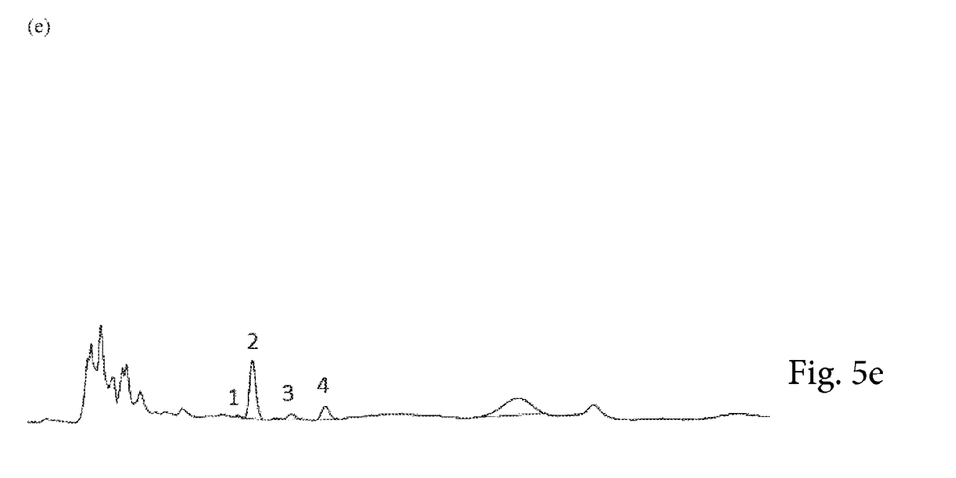

As shown in FIGS. 1 and 4, the aqueous *stevia* slurry may be formed in a mixing chamber 11. The mixing chamber can include a first opening for receiving *stevia* powder and a second opening for receiving a solvent (e.g., deionized water), optionally at a temperature of between about 45° C. and about 75° C. The mixing chamber can optionally include a third opening (e.g., on the top) that is configured to allow a mixing unit to mix the constituents within the mixing chamber. The mixing chamber can have a fourth opening at the bottom (e.g., directly opposite to the top opening) for discharging the aqueous *stevia* slurry.

The ratio of *stevia* powder to solvent can be adjusted for the needs of the extraction machinery. In one example, the ratio of *stevia* powder to water may be between about 1.0 and about 12.0 by weight. According to another exemplary embodiment, the ratio may be between about 1.0 and about 10.0. Other embodiments include a *stevia* powder material:water ratio in the range of between about 1:10 and about 1:16 v/v, or a *stevia* powder material:water at a ratio in the range of between about 1:9 and about 1:20 or a *stevia* powder material:water ratio in the range of between about 1:7.8 and about 1:20 v/v, for example, about 1:7.8, about 1:17.2 or about 1:20 v/v.

The solvent (e.g., water) is generally kept at a temperature above room temperature. For example, in one embodiment, the water is heated to a temperature of between about 45° C. and about 75° C. and the *stevia* powder is added. In another embodiment, the *stevia* powder is added and the aqueous slurry is raised or lowered to a temperature of between about 45° C. and about 75° C. In some embodiments, the temperature of the solvent or the slurry is maintained at about 45° C., 50° C., 55° C., 60° C., 65° C., 70° C., or 75° C.

The aqueous *stevia* slurry may be formed in a mixing chamber, for example, a chamber being vertically disposed and having an opening for receiving *stevia* powder and solvent, e.g., water, at a temperature between about 45° C. and about 75° C., and an opening for discharging aqueous *stevia* slurry. The mixing chamber is not necessarily limited by this embodiment, and changes to the mixing chamber are within the scope of this description. In one embodiment, the opening for receiving *stevia* powder and solvent is on the top of the mixing chamber, and the opening for discharging aqueous *stevia* slurry is on the bottom of the mixing chamber. In one embodiment, the opening for discharging aqueous *stevia* slurry is directly opposite the top opening. In other embodiments, the aforementioned openings may be located at different positions (or even the same position) on the mixing chamber so long as the aqueous *stevia* slurry is formed.

In one embodiment, the aqueous *stevia* slurry is agitated by conventional means in the mixing chamber. This agitation may be continuous or intermittent during the residence time in the mixing chamber. In one embodiment, the aqueous *stevia* slurry is agitated for at least 30 minutes before sending the slurry to the next step. In some embodiments, the aqueous *stevia* slurry is agitated at a RPM in the range of between about 50 and about 500.

The aqueous *stevia* slurry is held in the mixing chamber for a period of time. For example, in one embodiment, the *stevia* powder is allowed to soak in the aqueous environment comprising a solvent for between about 1 and about 24 hours, and according to a particular embodiment, for between about 1 and about 12 hours. According to another exemplary embodiment, the *stevia* powder is allowed to soak in the aqueous environment for between about 4 and about 12 hours, or between about 6 and about 8 hours. As noted above, the aqueous *stevia* slurry may be agitated for all or some of the time in which the *stevia* slurry is held in the mixing chamber. Applicants believe the soaking also helps for removal of larger debris and reduces the chances of passing through filtration unit which is collected in the bottom of the tank and removed periodically as deemed necessary.

In some embodiments, the aqueous *stevia* slurry also contains activated charcoal, for example, between about 5% and about 20% w/w activated charcoal.

The aqueous *stevia* slurry is then optionally subjected to additional steps, such as filtration. In one embodiment, the aqueous *stevia* slurry is filtered to remove the larger foreign particles and debris. See, e.g., FIGS. 1 and 4, filtration unit 15. The filtration may be conducted at any temperature, but it is preferred that the filtration occur at room temperature, or at a temperature between room temperature and about 75° C. In one embodiment, the filtration is performed by passing the aqueous *stevia* slurry through a filter (e.g., a paper filter) at room temperature and the filtrate is provided to the extraction column. In one embodiment, the porosity of the filter is such that *stevia* powder having an average particle size of between about 70 and about 177 microns cannot pass through. For example, using filter no. 40-45 of Whitman porosity of 0.2-40 microns, preferably 0.5-20 microns and at standard pressure or at a reduced pressure (e.g., between 9 and 12 psi). In another embodiment, the porosity of the filter may be larger if, e.g., the *stevia* powder is of a larger size. In another embodiment, the slurry is filtered via a vacuum filtration method at a temperature between about 15° C. and about 35° C. For example, a using a high volume continuous filtration device may be used. It may have a porosity that allows for the *stevia* slurry to pass through, but not the larger foreign particles and debris. In another embodiment, the filter may have a porosity that allows for the filtration of the larger foreign particles, debris, color as well as the powder particulates from the slurry.

Adsorbent Resin Column of Aqueous *Stevia* Slurry and Desorption of Glycosides

In some embodiments, the aqueous *stevia* slurry is next introduced to an extraction chamber or column, also referred to as an adsorbent resin column 20, to produce an adsorption resin liquid containing mixture. The extraction chamber or column for containing the adsorbent resins can be of the scale suitable for laboratory or commercial scale extraction.

Adsorbent resin columns are known in the art. For example, a vertical container (tube) made from glass, having internal diameter of about 3-5 inches and length of 48 inches. Alternatively, the column may be made from another material as understood by one skilled in the art suitable for holding the resin wherein the *stevia* slurry can be added so that the resin adsorbs the impurities and color from the *stevia* slurry, and ethanol can be added to desorb the glycoside or sweet compounds. Likewise, the shape and dimensions of the column may be altered based on available devices and to suit the application.

Adsorbent resins of the present embodiments are known in the art. Non-limiting examples of the adsorbent resin include, Hypersol-Macronet MN-1023, Purosorb PAD910-Purolite MN100, Amberlite FPC22H and 22Na, and Doe monosphere 66.

Figure 3:
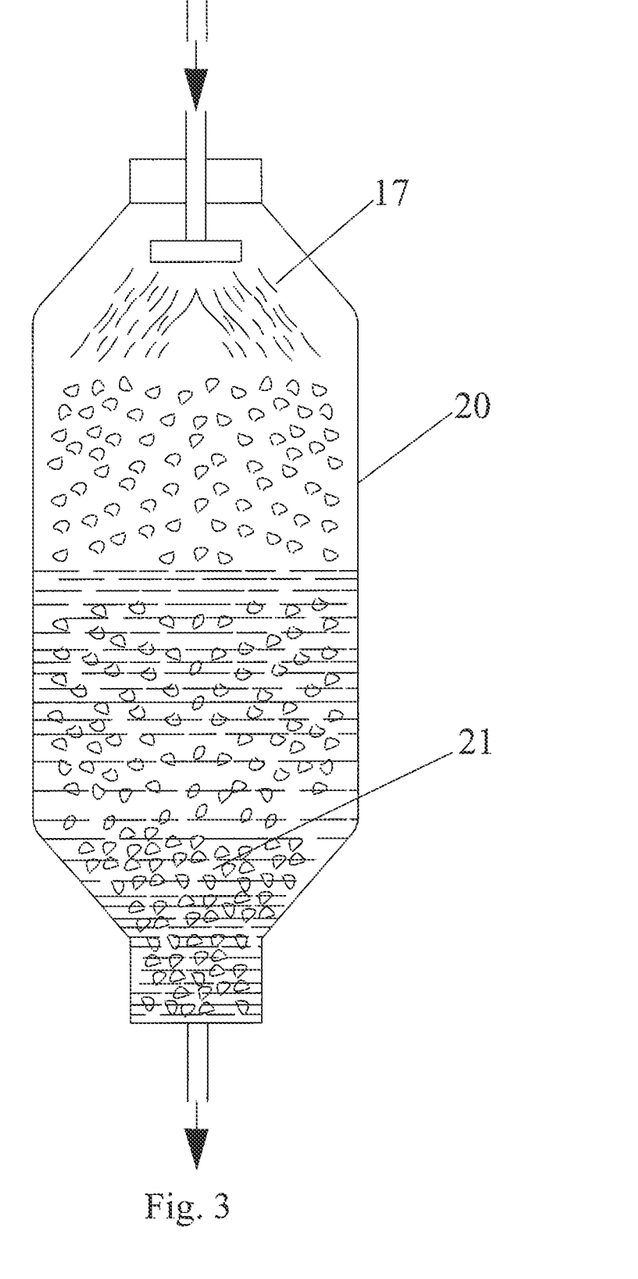
FIG. 3 is a schematic diagram of a portion of the system shown in FIG. 2 according to an exemplary embodiment.

In one embodiment, the procedure can be performed in a manner similar to that in FIG. 3. That is, the aqueous *stevia* slurry is added into the column (denoted by reference number 20 in FIG. 3) via a gravity feed device for liquid filling (denoted by reference number 17 in FIG. 3). The aqueous *stevia* shiny is allowed to contact the adsorbent resins (designated by reference number 21 in FIG. 3) in the adsorption resin column 20, which allows the resins to adsorb the sweet compounds from the aqueous *stevia* slurry. In one embodiment, the aqueous *stevia* slurry is introduced to the adsorption resin column 20 after the column is filled with the resin.

The ratio of *stevia* powder to water being introduced to the extraction column can be controlled. In one embodiment, the *stevia* powder slurry is added to an extraction column charged with adsorbent polymer resins to provide a ratio of *stevia* powder material to water in the range of between about 1:0.075 v/v and about 1:10 v/v, for example, about 0.01:0.10 v/v, or about 0.10:0.0075 v/v or about 0.10:0.007 v/v.

The *stevia* powder slurry may be held in the extraction column for a time suitable to allow for the resins to adsorb the sweet compounds from the aqueous *stevia* slurry (for example, about 10, 20, 30, 40, 50, 60, 70, 80, 90, or 100 minutes, e.g., between about 10 and about 40 minutes or any range therein between). The flow rate may be adjusted to achieve this residence time, for example, the residence times in the chamber can be equal to the output rate defined by the delivery pump 16. In one embodiment, the flow rate is in the range of between about 40 and about 55 ml/minute. The temperature at which the aqueous *stevia* slurry is added may be adjusted to, e.g., a temperature of between about 14° C. and about 35° C. or between about 20° C. and about 35° C.

Next, to the column, a desorption solvent, e.g., ethanol composition (e.g., between about 70% and about 95% or greater ethanol composition) can be introduced, and the eluted liquid is collected. In some embodiments, the desorption solvent contains a desorption solute selected from the group consisting of methanol, ethanol, toluene, glycerin, and mixtures thereof. The desorption solvent can contain between 40% and 95% or greater of the desorption solute. It is understood that when the present disclosure refers to ethanol or alcohol, another desorption solute, such as those described above, may replace the ethanol or alcohol and still be within the scope of the disclosed embodiments.

In some embodiments, the ethanol is added in an amount to form the mixture ratio of liquid slurry:ethanol in the range of between about 1:7 v/v and about 1:2 v/v, for example about 1:7 or about 1:2.3 v/v. In some embodiments, the desorption solute is selected from the group consisting of methanol, ethanol, toluene, glycerin, and mixtures thereof. The desorption solvent can contain between about 40% and about 95% or greater of the desorption solute.

In some embodiments, a desorption solvent is introduced to the adsorption resin liquid containing mixture in a desorption column 25. The desorption column contains an opening for receiving the desorption solvent. The glycoside from the liquid mixture is adsorbed by resin within the desorption column, which is typically a glass column. An elute collection device 35 may be used to collect the extract, flow of which is controlled by flow control valve 26. Solvent from the column 25 is optionally collected in the solvent recovery chamber 30, and elute extract is collected in the column chamber 35, a batch extraction of the mixture can then be done at a room temperature, or a specific designed temperature. It will be appreciated that a continuous operation can also be employed for this process, e.g., by using several columns, or large vessel as detailed in this application and while one is being drained, the next one is being filled, without departing from the concept of the invention.

In some embodiments, the aqueous *stevia* slurry is not contacted with an adsorbent resin.

The elute from the desorption column is then optionally mixed with activated charcoal, followed by filtration, e.g., vacuum or gravity filtration.

Additional Extraction Steps

After collection, the elute is subjected to additional extraction steps. In some embodiments, this includes extraction of water, ethanol or other impurities.

For example, in some embodiments, the elute is mixed with activated charcoal, for example, between about 5% and about 20% or between about 0.2% and about 3.0% or between about 0.2% and about 4% or between about 2% and about 4% w/w or between about 2% and less than 20% w/w activated charcoal. In one embodiment, the activated charcoal is present in between about 5% and about 19% w/w based on charcoal that is made from coconut shell. The elute-charcoal composition can be mixed for a predetermined time and speed to form a homogeneous elute. The elute-charcoal composition can be mixed at a predetermined time and speed, e.g., for a period of between about 10 and about 60 minutes at between about 100 and about 700 rpm or between about 230 rpm and about 330 rpm or between about 150 rpm and about 400 rpm or between about 150 rpm and about 700 rpm.

The elute-charcoal composition is then filtered to remove the charcoal impurities to provide an odorless and reduced color extract. In one embodiment, the filtration unit can have a vacuum in the range of between about 9 psi and about 12 psi and filter openings of between about 5 and about 20 or between about 0.25 and about 15 or between about 0.25 and about 20 microns. In a preferred embodiment, the filter openings are approximately 0.45 microns. It is understood that other pressure and filter opening sizes may be selected based on the size of the charcoal used to provide the odorless and reduced color extract.

The extract recovered at this stage can contain between about 85% and about 89.5% or between about 89% and about 99.1% of the sweet compounds originally contained in the *stevia* powder. In some embodiments, the extract recovered at this stage contains greater than about 85%, 90%, 95%, 98%, or 99% of the sweet compounds originally contained in the *stevia* powder. In some embodiments, the sweet compounds originally contained in the *stevia* powder refer to sweet compounds originally contained in the *stevia* powder that are not considered to contain an undesirable aftertaste.

The elute may also be passed through an alcohol and water extract device, such as a vacuum evaporator unit, which can operate at proper conditions for removal of the water and alcohol, e.g., at a temperature of between about 55° C. and about 85° C. and vacuum pressure of about 9 to about 14 psi or at a temperature of between about 45° C. and about 85° C. and vacuum pressure of between about 7 and about 14.3 psi. Vacuum evaporator units are known in the art, and include, e.g., a roto vapor unit.

Filtered Sweet Extract Collection

After filtration, the filtered sweet extract is collected. As shown in FIGS. 1 and 4, the experimental conditions are optimized to elute the majority of the sweet compounds of interest 50, once most of the undesirable impurities 55 are eluted, the feed is collected for final recovery of the sweet compounds 50 of interest.

Figure 2:
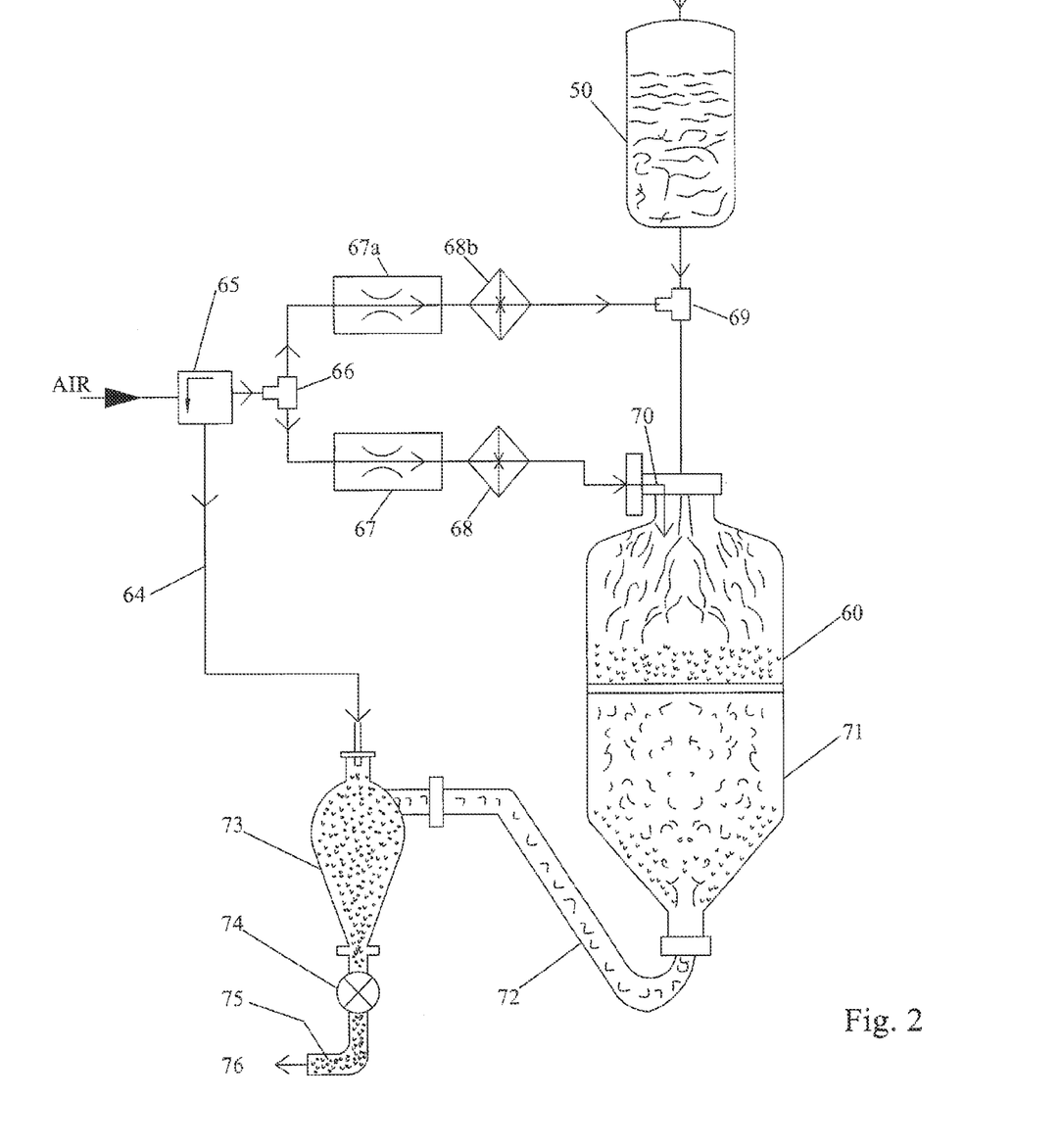
FIG. 2 is a schematic diagram of a portion of a system for debitterizing *stevia* according to an exemplary embodiment.

The feed of the filtered sweet extract, 50, is spray dried and the resulting product is collected. In one embodiment, the spray drying and collection process is conducted in a manner similar to that in FIG. 2. That is, elute from the elute collection chamber 50 is passed through an air and elute inlet at a pressure P1, 69, to the spray chamber of spray dryer, 60. The temperature and pressure of the air and elute inlet can be controlled by a flow control valve pressure outlet P1 (67a) and a heating media for air at temp. T1 (68b). The air inlet to spray chamber is also in communication with the pressure control valve, 65, at pressure P2, 70. The temperature and pressure of the spray chamber can be controlled by a flow control valve pressure outlet P2 (67) and a heating media for air at temp. T2 (68). In the spray chamber of spray dryer, 60, the elute is particalized in spray dryer, 60, and the particles are collected in 71, the product crystal accumulator. The crystal powder can then be transferred by the cyclone device, 72, to the power collector cyclone unit, 73, which is in communication with the Pressure control valve, 65, via Air to cyclone unit at pressure P3, 64. The powder outlet valve, 74, controls release of the dry powder of *stevia* sweetener, 75, which is sent to a collection bed for dry powder of *stevia* sweetener, 76.

Alternate Embodiments

In other embodiments, the aqueous *stevia* slurry is filtered to remove larger foreign particles, debris, color as well as the powder particulates. The filtered liquid is introduced to an extraction chamber, the chamber being vertically disposed and having a top opening for receiving mixed liquid slurry and bottom opening about 90° from the top opening for extract of sweet compound, at a temperature between about 14° C. and about 35° C. to the chamber, to provide a *stevia* powder material:deionized water ratio in the range of between about 1:0.07 v/v and about 1:0.075 v/v.

The mixture is held for a period of time (e.g., about 1-4 hours) before discharging to an alcohol mixing chamber. Once discharged, the elute is mixed with Ethanol having a concentration of between about 70% and about 100% using predetermined speed (e.g., from between about 150 rpm and about 4000 rpm) with appropriate time to form homogeneous elute. The homogeneous elute is passed through a filtration system, e.g., a double filtration pump, to remove additional color and undesired particulate, and is mixed with activated charcoal having pre-determined porosity using a predetermined speed (e.g., from between about 150 rpm and about 700 rpm) with recalculated time to form a mixed elute. The resulting elute including the sweet compounds is passed through a filtration unit having a vacuum (e.g., in the range of between about 9 psi and about 12 psi) and filter having opening of e.g., between about 0.25 and about 15 microns, and between about 89% and about 99.1% of the sweet compounds are recovered based on the initial amount of sweet compounds in the *stevia* powder.

The elute may then be passed through extraction devices to remove alcohol (or other desorption solvent) and water, and may be subjected to spray drying as described elsewhere in this disclosure.

Particular Embodiments

FIGS. 1 to 4 outline specific embodiments of the present disclosure. The present disclosure has already made reference to many of the features of these figures. Provided herein below are embodiments of the disclosure based on the flow charts in FIGS. 1 and 4. These embodiments are intended to be illustrative of the present disclosure, and are not limiting. It is understood that one or more of these steps may be optional.

In one embodiment, *stevia* powder is transferred from a *stevia* powder storage, 10, to a *stevia* powder and de-ionized water mixing chamber, 11, the powder and de-ionized water are mixed at a predetermined temperature, as disclosed herein, e.g., at about 50-55° C. Next, the powder and de-ionized water mixture is filtered, 15, and the filtrate is passed to an adsorption column, 20, after contacting the adsorbent, the glycosides and other sweet compounds of the *stevia* are desorbed by passing a desorption solution through the column, 25, and the elute is collected, 35. The elute is next mixed with activated charcoal in an elute and activated charcoal mixing chamber, 40, and again filtered at a disclosed temperature, e.g., about 10-40 in a vacuum filtration unit for sweet compound extraction, 45. The filtered sweet extract may be collected and tested by methods known in the art, e.g., HPLC, and the undesirable component of elute may be sent to a disposal unit, 55. The filtered sweet extract in the final elute collection chamber, 50 is then sent to the spray dryer, 60, and the spray dried sweet extract is collected as dry powder of *stevia* sweetener in a collection bed, 75.

FIG. 4 discloses another embodiment, suitable for commercial scale production wherein solvent recovery is utilized. *stevia* powder is transferred from a *stevia* powder storage, 10, to a *stevia* powder and de-ionized water mixing chamber, 11, the powder and de-ionized water are mixed at a predetermined temperature, as disclosed herein, e.g., at about 45-75° C. Filtration of the mixture is then performed, 15, and a delivery pump, 16, sends the filtrate to the Adsorption Resin column, 20, and after contacting the adsorbent, the glycosides and other sweet compounds of the *stevia* are desorbed by passing a desorption solvent through the column, 25. The desorption solvent may be recovered, 30, and recycled by solvent delivery pump, 31, back into the system. The elute is collected at a rate controlled by Flow control valve, 26, and collected in the Elute collection column, 35. Elute is then mixed with activated charcoal in mixing chamber 40 and transferred to a Vacuum filtration unit for sweet compound extraction, 45, by Flow control valve 41. The elute is next filtered at a disclosed temperature, e.g., between about 10 and about 40° C. The filtered sweet extract may be collected and tested by methods known in the art, e.g., HPLC, and the undesirable component of elute may be sent to a disposal unit, 55, and ultimately to an elute treatment tank 56. The filtered sweet extract in the final elute collection chamber, 50 is sent to the spray dryer, 60, and the spray dried sweet extract is collected as dry powder of *stevia* sweetener in a collection bed, 75.

FIG. 5 discloses another embodiment, wherein the elute comprising desorbed *stevia* extract is mixed with varying amounts of activated charcoal. Each of the samples was prepared in a similar fashion based on the disclosed embodiments, but for the use of varying amounts of activated charcoal were used. Sample 1 was mixed with between 1 and 2% activated charcoal, Sample 2 was mixed with 3% activated charcoal and Sample 3 was mixed with 20% charcoal. Sample 4 is raw *stevia* powder.

TABLE 1

Sample compositions of elute comprising desorbed *stevia* extract after treating with activated charcoal

| Analyte name | Sample -1 | Sample -2 | Sample -3 | Sample -4 |
| --- | --- | --- | --- | --- |
| Dulcoside A (mg/ml) | 0.0188 | 0.0132 | 0.0121 | 0.0013 |

TABLE 1-continued

Sample compositions of elute comprising desorbed stevia extract after treating with activated charcoal

| Analyte name | Sample -1 | Sample -2 | Sample -3 | Sample -4 |
|---|---|---|---|---|
| Stevioside (mg/ml) | 0.7683 | 0.574 | 0.539 | 0.0843 |
| Rebaudioside C (mg/ml) | 0.042 | 0.031 | 0.029 | 0.004 |
| Rebaudioside A (mg/ml) | 0.1178 | 0.089 | 0.0842 | 0.017 |
| Steviolbioside (mg/ml) | 0.0012 | 0.0007 | 0.0006 | ND |
| Rebaudioside B (mg/ml) | 0.001 | 0.0009 | 0.0085 | ND |
| Total Sweetener | 0.9491 | 0.7088 | 0.6734 | 0.1066 |

TABLE 2

Results of isolated product from methods of disclosure

| Sample | Flavor | initial/After test | Mouth feel | Substance |
|---|---|---|---|---|
| sample 4 | it is less sweet and leaves flavor | Bitterness in aftertaste | Acceptable in raw form | raw leaf Powder |
| sample 3 | sweet and balance flavor | slight Bitterness in aftertaste | Acceptable | Stevia crystal |
| sample 2 | sweet and balance flavor | slight Bitterness in aftertaste | Acceptable | Stevia crystal |
| sample 1 | sweet, pleasant flavor | No bitterness | Acceptable | Stevia crystal |

*Sample 1 went through double filtration whereas Sample 2 was filtered a single time.

The analytical results of the samples is shown in FIG. 5. FIG. 5(a) discloses a Standard; FIG. 5(b) discloses a chromatogram of the Sample-1 made by using 1-2% activated charcoal during mixing; FIG. 5(c) discloses a chromatogram of the Sample-2 made by using 3% activated charcoal during mixing; FIG. 5(d) discloses a chromatogram of the Sample-3 made by using 20% activated charcoal during mixing.

As can be seen from these results, when the amount of charcoal is 20%, the output of the sweeter is reduced and value of the sweetness is reduced. Furthermore, it has been observed that if the quantity of charcoal is less than 0.5% then the color removal is less and the elute comes out darker.

What is claimed is:

1. A method for extracting sweet compounds from stevia plant powder, comprising:
   i) mixing stevia powder and deionized water at a temperature of between about 45° C. and about 75° C. to create a stevia powder slurry;
   ii) filtering the stevia powder slurry;
   iii) adding the filtered stevia powder slurry to an extraction column charged with adsorbent polymer resins to provide a stevia powder material:water ratio in the range of between about 1:10 and 1:16 v/v;
   iv) adding an ethanol solution having between about 70% and about 100% ethanol concentration to the extraction column, forming a mixture ratio of liquid slurry:ethanol in the range of between about 1:2.3 and about 1:3.75 v/v to discharge an elute;
   v) mixing the elute with activated charcoal;
   vi) filtering the elute;
   vii) removing the ethanol from the elute;
   viii) passing the alcohol-free elute through a water extraction device; and
   ix) spraying the elute using a spray drying unit to produce a composition comprising the extracted sweet compounds.

2. The method according to claim 1, further comprising holding the stevia powder slurry for between about 8 and about 12 hours prior to step (ii) or (iii).

3. The method according to claim 1, wherein step (ii) is performed using vacuum filtration, using filter no. 40-45 of Whitman porosity of between about 0.5 and about 20 microns at a pressure of between about 9 and about 12 psi.

4. The method according to claim 1, wherein a collected volume of the elute is not greater than a feed volume of the stevia powder slurry.

5. The method according to claim 1, wherein in step (iii), the stevia powder slurry is provided at a temperature of between about 20° C. and about 35° C.

6. The method according to claim 1, wherein a residence time in the extraction column is between about 10 and 40 minutes.

7. The method according to claim 1, wherein the stevia powder comprises particles having an average particle diameter of between about 70 and about 177 microns.

8. The method according to claim 1, wherein step (i) is performed in a mixing chamber, the chamber being vertically disposed and having a top opening for receiving the stevia powder and deionized water, and a bottom opening located directly opposite to the top opening for discharging the stevia slurry.

9. The method according to claim 1, wherein step (ii) is performed at room temperature.

10. The method according to claim 1, wherein the extraction column is vertically disposed and comprises a top opening for receiving stevia slurry liquid and a bottom opening for the elute.

11. The method according to claim 1, wherein in step (v), the activated charcoal is present in an amount between about 2% and about 4% by weight.

12. The method according to claim 1, wherein the filtering step (vi) utilizes a filtration unit having a vacuum in the range of between about 9 psi and about 12 psi and a filter having openings of between about 5 and about 20 microns.

13. The method according to claim 1, wherein after the filtering step (vi), between about 85% and about 89.5% of the total sweet compounds in the initial stevia plant powder are recovered.

14. A method of extracting sweet compounds from stevia plant powder in a production-scale environment, the method comprising:
   i) mixing stevia powder and deionized water at a temperature between about 45° C. and about 75° C. to create a stevia powder slurry;
   ii) filtering the stevia powder slurry;
   iii) adding the filtered stevia powder slurry to an extraction column charged with adsorbent polymer resins to provide a stevia powder material:water ratio in the range of between about 1:7.8 and about 1:20 v/v;
   iv) adding an ethanol solution having between about 70% and about 100% ethanol concentration to the extraction column, forming a mixture ratio of liquid slurry:ethanol in the range of between about 0.010:0.12 v/v and about 0.10:0.15 v/v to discharge an elute;
   v) mixing the elute with activated charcoal;
   vi) filtering the elute;
   vii) removing the ethanol from the elute;
   viii) passing the alcohol free elute through a water extraction device; and ix) spraying the elute using a spray drying unit to produce composition comprising the extracted sweet compounds.

15. The method according to claim 14, further comprising mixing the *stevia* powder slurry for between about 8 and about 14 hours prior to step (ii).

16. The method according to claim 14, wherein step (ii) is performed using vacuum filtration at a temperature between about 15° C. and about 35° C., using a high volume continuous filtration device having a porosity diameter less than an average particle diameter of the *stevia* powder.

17. The method according to claim 14, wherein a collected volume of the elute is not greater than than a feed volume of the *stevia* powder slurry.

18. The method according to claim 14, wherein in step (iii), the *stevia* slurry is provided at a temperature of between about 15° C. and about 35° C.

19. The method according to claim 14, wherein a residence time in the extraction column is equal to an output rate from the step (i) to step (ii).

20. The method according to claim 14, wherein the *stevia* powder has an average particle diameter of about 60 microns.

21. The method according to claim 14, wherein step (i) is performed in a receiving chamber, the receiving chamber being vertically disposed and having a first opening for receiving *stevia* powder, a second top opening for receiving water, a third opening for a mixing unit, and a fourth opening for discharging the *stevia* powder slurry.

22. The method according to claim 14, wherein the step (ii) is performed at room temperature.

23. The method according to claim 14, wherein the extraction column is vertically disposed and comprises a top opening for receiving *stevia* powder slurry and a bottom opening 90° from the top opening for discharging of the elute.

24. The method according to claim 14, wherein in step (v), the activated charcoal is present in an amount between about 0.2% and about 3.0%.

25. The method according to claim 14, wherein the filtering step (vi) utilizes a filtration unit having a vacuum in the range of between about 9 psi and about 12 psi and a filter having openings of between about 0.25 to about 15 microns.

26. The method according to claim 14, wherein after the filtering step (vi), between about 89% and about 99.1% of the total sweet compounds in the initial *stevia* plant powder are recovered.

27. A method of extracting sweet compounds from *stevia* plant powder, the method comprising:
   i) mixing *stevia* powder and deionized water at a temperature between about 45° C. and about 75° C. to create a *stevia* powder slurry;
   ii) filtering the *stevia* powder slurry;
   iii) adding the filtered *stevia* powder slurry at a temperature between about 14° C. and about 35° C. to an extraction chamber, the extraction chamber being vertically disposed and having a top opening for receiving filtered *stevia* powder slurry liquid and a bottom opening opposite the top opening for discharging the sweet compounds, the chamber configured to provide a *stevia* powder material:water ratio in the range of between about 0.070:0.7 v/v and about 0.07:0.95 v/v;
   iv) holding the *stevia* powder slurry at a room temperature for a period of between about 1 and 4 hours;
   v) mixing the *stevia* powder slurry with ethanol having a concentration between about 70% and about 100% to form a homogeneous elute;
   vi) passing the elute through a filtration pump;
   vii) mixing the elute with activated charcoal; and
   viii) filtering the elute.

28. The method according to claim 27, wherein step (i) is performed for a period of between about 4 and about 24 hours using a continuous homogenizer unit.

29. The method according to claim 27, further comprising passing the *stevia* powder slurry through a high volume continuous filtration unit.

30. The method according to claim 27, wherein the *stevia* powder slurry in step (v) is provided at a temperature of between about 20° C. and about 40° C.

31. The method according to claim 27, wherein the *stevia* plant powder has an average particle diameter of between about 20 and about 60 microns.

32. The method according to claim 27, further comprising
   ix) removing the ethanol and water from the elute; and
   x) spraying the elute using a spray drying unit to produce a a composition comprising the extracted sweet compounds.

33. The method according to claim 27, wherein the *stevia* plant powder is powdered leaves or powdered plant extract.

* * * * *